(12) United States Patent
Rick

(10) Patent No.: US 9,045,109 B2
(45) Date of Patent: Jun. 2, 2015

(54) GASBAG FOR A PEDESTRIAN PROTECTION SYSTEM AND A MOTOR VEHICLE EQUIPPED THEREWITH

(71) Applicant: GM GLOBAL TECHNOLOGY OPERATIONS LLC, Detroit, MI (US)

(72) Inventor: Ulrich Rick, Braunweiler (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/685,533

(22) Filed: Nov. 26, 2012

(65) Prior Publication Data

US 2013/0133971 A1 May 30, 2013

(30) Foreign Application Priority Data

Nov. 26, 2011 (DE) .......................... 10 2011 119 564

(51) Int. Cl.
*B60R 21/36* (2011.01)
*B60R 21/38* (2011.01)
*B60R 21/233* (2006.01)
*B60R 21/235* (2006.01)

(52) U.S. Cl.
CPC ................ *B60R 21/36* (2013.01); *B60R 21/38* (2013.01); *B60R 21/233* (2013.01); *B60R 21/235* (2013.01); *B60R 2021/23509* (2013.01)

(58) Field of Classification Search
CPC ........ B60R 21/38; B60R 21/34; B60R 21/36; B60R 21/233; B60R 21/235; B60R 2021/34
USPC ............... 180/271, 274, 69.21; 280/729, 742, 280/743.1; 296/187.04, 193.11
See application file for complete search history.

(56) References Cited

U.S. PATENT DOCUMENTS

| | | | | |
|---|---|---|---|---|
| 3,840,246 A | * | 10/1974 | McCullough et al. | 280/738 |
| 3,883,154 A | * | 5/1975 | McCullough et al. | 280/735 |
| 5,382,051 A | * | 1/1995 | Glance | 280/751 |
| 5,556,128 A | | 9/1996 | Sinnhuber et al. | |
| 5,586,782 A | * | 12/1996 | Zimmerman et al. | 280/730.2 |
| 6,059,312 A | | 5/2000 | Staub et al. | |
| 6,467,563 B1 | * | 10/2002 | Ryan et al. | 180/274 |

(Continued)

FOREIGN PATENT DOCUMENTS

| | | | | |
|---|---|---|---|---|
| DE | 2115146 A1 | * | 10/1971 | B60R 21/10 |
| DE | 19541513 A1 | | 5/1996 | |

(Continued)

OTHER PUBLICATIONS

German Patent Office, Search Report for German Application No. 102011119564.9, dated Jul. 12, 2012.

(Continued)

*Primary Examiner* — Ruth Ilan
*Assistant Examiner* — Barry Gooden, Jr.
(74) *Attorney, Agent, or Firm* — Ingrassia Fisher & Lorenz PC

(57) ABSTRACT

A gasbag for a pedestrian protection system, when in the inflated state encompasses a first, oblong central section and end sections angled away from the ends of the first central section. At least one first and one second membrane with differing permeability values are distributed over the sections in such a way that an average permeability of the end sections is lower than an average permeability of the first central section.

17 Claims, 3 Drawing Sheets

(56) References Cited

U.S. PATENT DOCUMENTS

| | | | |
|---|---|---|---|
| 6,474,679 B2* | 11/2002 | Miyasaka et al. | 280/730.1 |
| 6,497,302 B2* | 12/2002 | Ryan | 180/274 |
| 6,715,786 B1* | 4/2004 | Willibey | 280/729 |
| 6,883,631 B2* | 4/2005 | Hu et al. | 180/274 |
| 6,910,713 B2 | 6/2005 | Keshavaraj | |
| 6,920,954 B2* | 7/2005 | Hashimoto et al. | 180/274 |
| 6,955,238 B2* | 10/2005 | Takimoto | 180/274 |
| 7,137,738 B2* | 11/2006 | Shah et al. | 383/103 |
| 7,243,754 B2* | 7/2007 | Mori et al. | 180/274 |
| 7,341,274 B2* | 3/2008 | Mori et al. | 280/728.2 |
| 7,390,014 B2* | 6/2008 | Takimoto | 280/730.1 |
| 7,438,473 B2* | 10/2008 | Borchardt | 383/103 |
| 7,584,988 B2* | 9/2009 | Okamoto et al. | 280/730.1 |
| 7,963,557 B2* | 6/2011 | Aho et al. | 280/743.1 |
| 8,104,563 B2* | 1/2012 | Narita et al. | 180/274 |
| 8,235,159 B2* | 8/2012 | Mildner | 180/274 |
| 8,302,989 B2* | 11/2012 | Takimoto et al. | 280/728.2 |
| 2003/0155750 A1* | 8/2003 | Hu et al. | 280/730.1 |
| 2003/0178239 A1* | 9/2003 | Takimoto | 180/274 |
| 2003/0213635 A1* | 11/2003 | Ryan et al. | 180/274 |
| 2004/0124620 A1 | 7/2004 | Keshavaraj | |
| 2005/0205333 A1* | 9/2005 | Mori et al. | 180/274 |
| 2005/0206139 A1* | 9/2005 | Mori et al. | 280/730.1 |
| 2006/0201731 A1* | 9/2006 | Nakamura | 180/274 |
| 2007/0023223 A1* | 2/2007 | Okamoto et al. | 180/274 |
| 2007/0114090 A1* | 5/2007 | Okamoto et al. | 180/274 |
| 2007/0296186 A1* | 12/2007 | Kwon | 280/729 |
| 2008/0296875 A1* | 12/2008 | Aho et al. | 280/729 |
| 2009/0014988 A1 | 1/2009 | Takimoto et al. | |
| 2010/0230944 A1* | 9/2010 | Narita et al. | 280/741 |
| 2010/0300792 A1* | 12/2010 | Yuan et al. | 180/274 |
| 2010/0307854 A1* | 12/2010 | Mildner | 180/274 |
| 2011/0278087 A1* | 11/2011 | Okamoto | 180/274 |
| 2014/0027195 A1* | 1/2014 | Kalliske et al. | 180/271 |

FOREIGN PATENT DOCUMENTS

| | | |
|---|---|---|
| DE | 19847854 A1 | 4/2000 |
| DE | 10102597 A1 | 9/2002 |
| DE | 10254589 A1 | 6/2003 |
| DE | 60005892 T2 | 7/2004 |
| DE | 102005041274 A1 | 3/2006 |
| EP | 1072479 A2 | 1/2001 |
| JP | 2004299516 A | 10/2004 |
| JP | 2004299518 A | 10/2004 |
| JP | 2007253923 A | 10/2007 |

OTHER PUBLICATIONS

Great Britain Patent Office, Great Britain Search Report for Great Britain Application No. 12211117.3, dated Mar. 22, 2013.

* cited by examiner

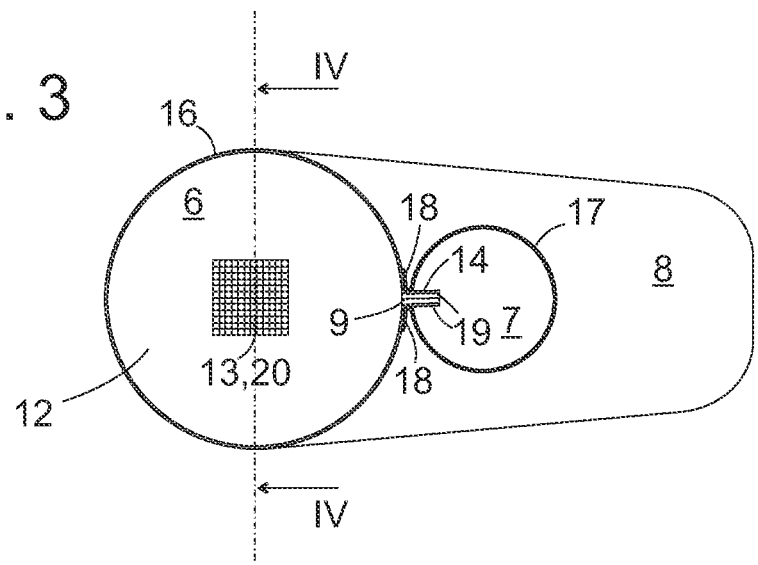
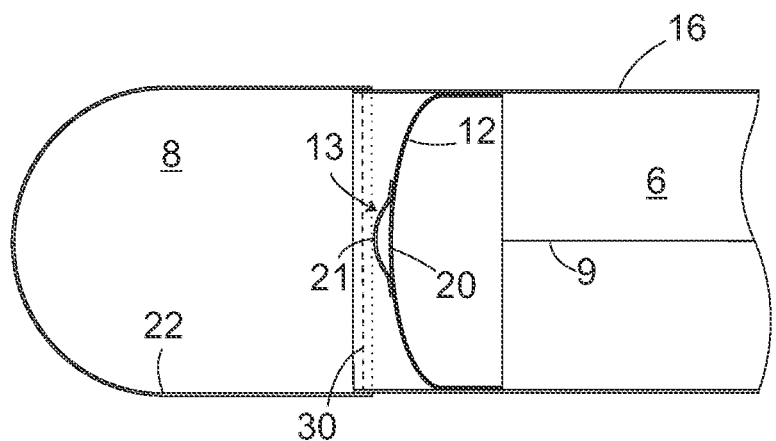
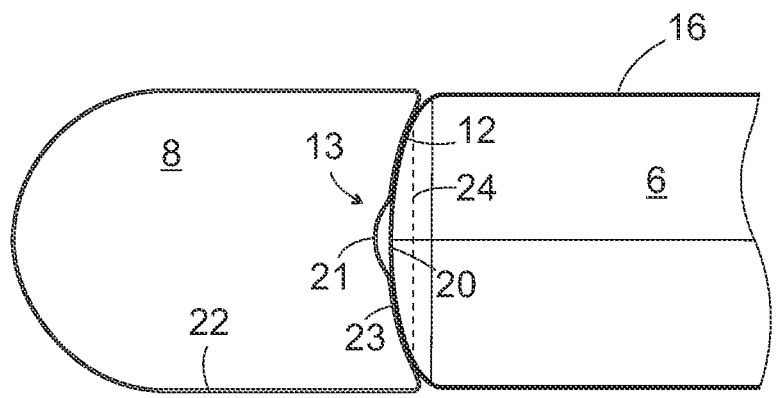

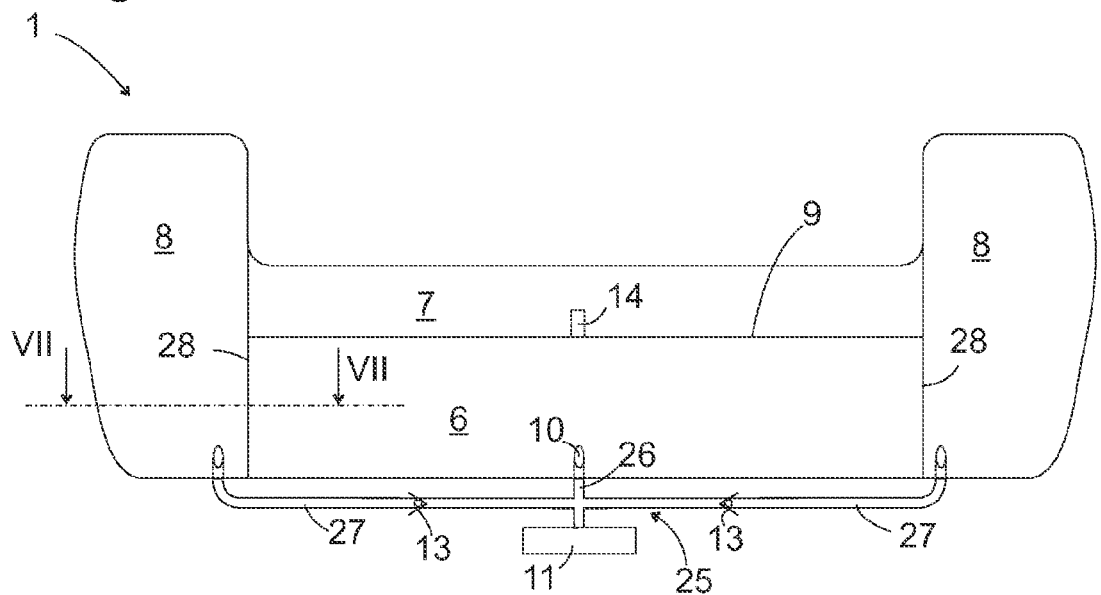
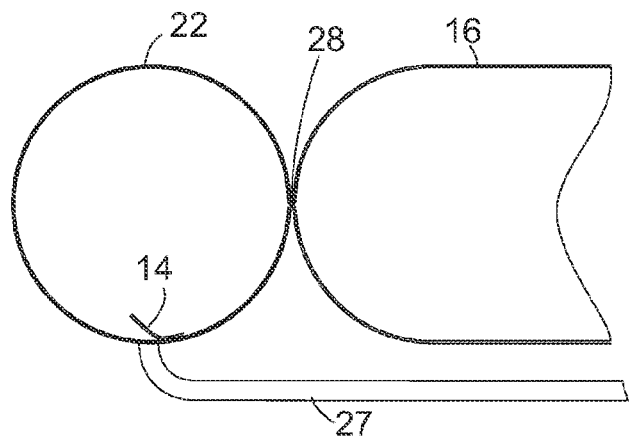

GASBAG FOR A PEDESTRIAN PROTECTION SYSTEM AND A MOTOR VEHICLE EQUIPPED THEREWITH

CROSS-REFERENCE TO RELATED APPLICATION

This application claims priority to German Patent Application No. 102011119564.9, filed Nov. 26, 2011, which is incorporated herein by reference in its entirety.

TECHNICAL FIELD

This application relates to a gasbag for a pedestrian protection system on a motor vehicle, which is provided so as to be inflated immediately when the vehicle comes into contact with a pedestrian, thereby cushioning the impact of the latter on the body.

BACKGROUND

For example, such a gasbag or a motor vehicle equipped therewith is known from DE 10 2005 041 274 A1. This conventional gasbag is tightly folded together under the rear edge of a front opening hood of the motor vehicle in an idle state, and when inflated, it first lifts up the front opening hood, to then expand through a gap created by lifting the hood, over a lower edge of a windshield adjoining the front opening hood and over the A-column that laterally encases the windshield. When the head of a pedestrian strikes the rear edge of the front opening hood, the hood is to yield at least at the point of impact, and the gasbag made flexible by the compressibility of the gas contained therein is to decelerate the penetrating motion of the head and, if at all possible, prevent it from breaking through into non-deformable fixtures in the engine compartment. Since the front opening hood disperses the force of impact over a large surface, a slight excess pressure in the gasbag is sufficient to build up the counterforce required to decelerate the impact.

However, if the head hits one of the end regions of the gasbag covering the A-columns, there is no structure to disperse the force of impact. Therefore, the deceleration experienced by the head given the same excess pressure in the gasbag is less when it strikes the end regions than when it hits the hood, and the danger of the head breaking through all the way to the A-column already exists at a relatively low speed of impact.

Made known by EP 1 072 479 B1 was a gasbag for installation in a motor vehicle steering wheel, which is comprised of cloth panels varying in permeability, so as to achieve a desired overall permeability for the gasbag.

Accordingly, it is desirable to provide improved gasbags for a pedestrian protection system that is able to effectively protect the head of a pedestrian, regardless of whether the latter strikes the front opening hood or parts of the motor vehicle body adjoining the latter. Furthermore, other desirable features and characteristics of the present invention will be apparent from the subsequent detailed description and the appended claims, taken in conjunction with the accompanying drawings and the foregoing technical field and background.

SUMMARY

In accordance with various embodiments, a gasbag for a pedestrian protection system is provided. The gasbag in the inflated state encompasses a first, oblong central section and end sections angled away from the ends of the first central section, in which the first central section is more strongly cushioned than the end sections. While a strong cushioning in the central section allows the latter to yield more easily when exposed to the force of an impact dispersed over a large area by the front opening hood, this is not the case at the end sections. In this way, the gasbag can be inflated with a high pressure required for effective protection at the end sections without the inherently desired flexibility of the first central section being lost as a result.

The desired cushioning can be realized with a variety of means, e.g., by arranging valves between the sections of the gasbag and the environment, so that gas can escape to the outside when a limiting pressure is exceeded via weak spots in the membrane that tear open when exposed to a high enough stress. In one embodiment, the gasbag exhibits at least one first and one second membrane with differing permeability values, and the membranes are distributed in such a way that an average permeability of the end sections is lower than an average permeability of the first central section.

A second central section can extend next to the first central section between the end sections, so as to cover the lower edge of a windshield adjoining the front opening hood during use. In order to be able to maintain a high pressure here as well, and thereby diminish the risk of penetration, the average permeability of the second central section may be lower than for the first central section.

In order to be able to inflate the gasbag in the shortest possible time when needed, a supply port can be provided for a gas generator, which can be located centrally on the first central section, and at least one of the other sections of the gasbag can be supplied with gas via the first central section. All other sections can be supplied via the first central section.

It is also conceivable to provide a distributor, which exhibits a supply port for a gas generator on the one hand, and ports connected with the central section and end sections on the other. By suitably selecting the length and cross section of the lines leading from the supply port to the ports of the individual sections, such a distributor makes it possible to control the deployment behavior of the individual sections.

In order to be able to simultaneously inflate the individual sections from the same gas generator, pathways are present for the gas to get from the gas generator to each section of the gasbag. However, to prevent a high permeability in the first central section from also leading to a premature pressure drop at the end sections, for example, two of the gasbag sections can be interconnected by a check valve, which only allows the respective gas to flow from an upstream to a downstream location of the two sections.

The downstream location of the two sections should exhibit a lower average permeability than the upstream section. In this way, a high pressure can initially be generated in both sections when igniting the gas generator, e.g., which in the case of the first central section is beneficial in quickly lifting up the front opening hood, and the pressure in the upstream section can again be allowed to fall shortly thereafter, while the high pressure remains intact in the downstream section, or the pressure at least drops more slowly than in the upstream section.

The two sections can extend on different sides of a membrane that partitions the gasbag; in this case, the check valve can be situated at a passageway of the membrane.

In particular a flap valve can be used as the check valve. One flap of this flap valve can be flexible like the membrane of the gasbag, so that it can deploy in conjunction with the latter while the gasbag inflates.

In another embodiment, the two sections border each other along a seam, and the check valve is situated in a gap in the seam.

In particular a lip valve is suitable for this type of attachment.

The first and second membrane with the different permeability values can be obtained from an identical initial fabric through varying impregnation, wherein the more permeable membrane can also remain unimpregnated.

In further embodiments, a motor vehicle with a gasbag of the kind described above is provided, wherein, in the inflated state, the first central section of the gasbag supports a front opening hood of the motor vehicle, and the end sections cover A-columns of the motor vehicle.

BRIEF DESCRIPTION OF THE DRAWINGS

The present disclosure will hereinafter be described in conjunction with the following drawing figures, wherein like numerals denote like elements, and:

FIG. 3 is a schematic cross section through the inflated gasbag along line III-III from FIG. 2; and FIG. 4 is a schematic section along the IV-IV line from FIG. 2 and FIG. 3;

FIG. 5 is a schematic view along the IV-IV line according to a second embodiment;

FIG. 6 is a top view analogous to FIG. 2 according to a third embodiment; and

FIG. 7 is a schematic section along the VII-VII line from FIG. 6.

DETAILED DESCRIPTION

The following detailed description is merely exemplary in nature and is not intended to limit the disclosure or the application and uses. Furthermore, there is no intention to be bound by any theory presented in the preceding background or the following detailed description.

Figure 1:
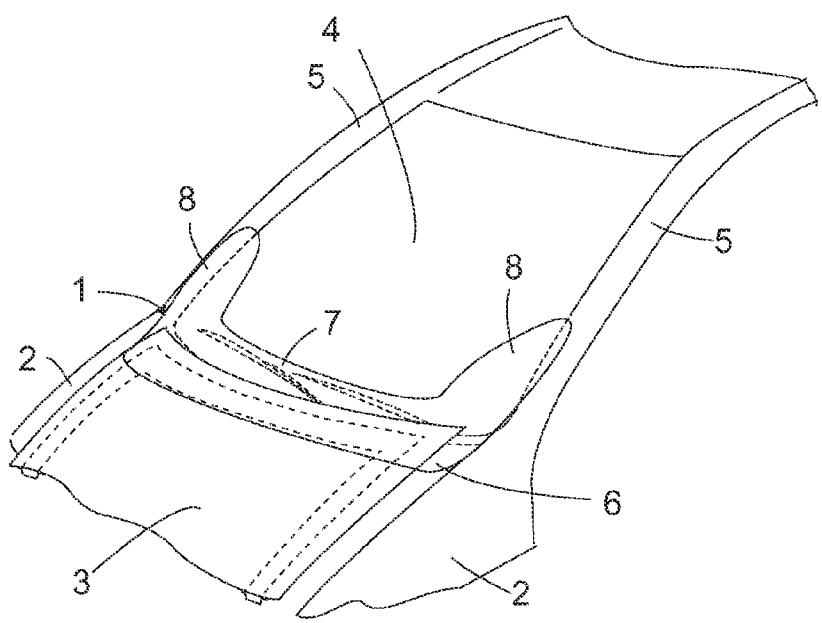
FIG. 1 is a schematic, perspective partial view of the body of a motor vehicle according to various exemplary embodiments with a lifted hood and inflated gasbag.

In a simplified, perspective view, FIG. 1 shows part of the body of a motor vehicle with a gasbag 1 according to the present disclosure as configured immediately after contact with a pedestrian. A front opening hood 3 normally flush with adjoining fenders 2 is lifted by the inflated gasbag 1 into a position where a portion of the gasbag 1, which is concealed under the rear edge of the hood 3 when not inflated and folded together in the idle state, has exited through a gap between the rear edge of the hood 3 and a windshield 4. A first, central section 6 of the gasbag 1 that supports the rear edge of the front opening hood 3 is for the most part concealed under the front opening hood 3. A second, central section 7 has positioned itself over the lower edge of the windshield 4, and end sections 8 each cover the lower regions of the A-columns 5 that laterally encase the windshield 4.

Figure 2:
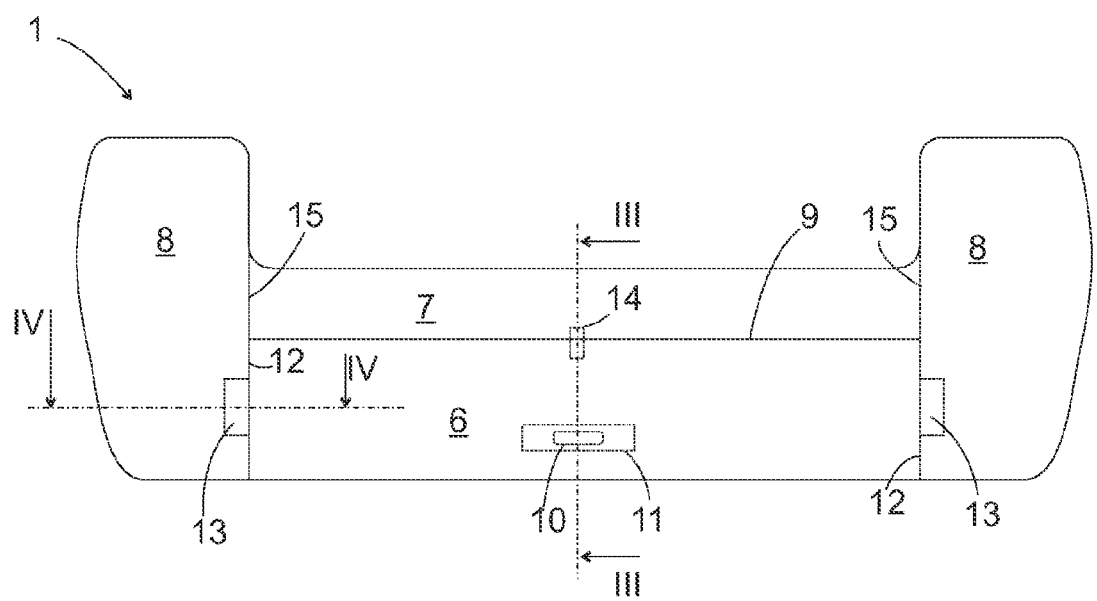
FIG. 2 is a schematic top view of the isolated gasbag of the motor vehicle from FIG. 1 according to a first embodiment.

FIG. 2 shows a schematic top view of the inflated gasbag 1 separated from the motor vehicle. Viewed from the top, the gasbag is roughly U-shaped, wherein the end sections 8 each comprise the lateral legs, and the central sections 6, 7 comprise a central piece of the U. The two central sections 6, 7 are delineated from each other by a seam 9. Pieces of fabric membrane that together form a cover for the gasbag 1 can be sewn and/or welded together along the seam 9.

The membrane on the lower side of the central section 6 incorporates an opening 10, to which the gas generator 11 is connected.

Stretched inside the gasbag 1 at the lateral ends of the central section 6 are internal membranes 12, which separate the central section 6 from the end sections 8. A respective check valve 13 is formed in the membranes 12, which allows the gas fed into the first central section 6 by the gas generator 11 to flow over into the end sections 8, but blocks the way back to the central section 6.

Another check valve 14 is arranged in an interrupted segment of the seam 9 between the central sections 6, 7, so as to allow gas to flow over from the first into the second central section 7, but block a return flow to the central section 6. Secured between the end sections 8 and the second central section 7 are impermeable membranes 15, so that no gas exchange takes place there.

The impermeability referenced here with respect to the gasbag 1 and the membranes that comprise it should not necessarily be taken to mean hermetic impermeability. In order to be regarded as impermeable within the context of the present disclosure, it is sufficient that the permeability of a membrane be so low that pressure changes owing to the passage of gas through the membrane during the time elapsed from the point where gas generator 11 is activated to the point where the impacting pedestrian has stopped decelerating are low enough not to significantly influence the deceleration process.

FIG. 3 shows a cross section through the inflated gasbag 1 along the III-III plane from FIG. 2. The sections 6, 7 are inflated into cylindrical hoses. The walls of sections 6, 7 are formed by two types of membranes 16, 17. While the membranes 16, 17 here consist of an identical backing fabric, the membrane 17 comprising the wall of the section 7 exhibits a diminished permeability relative to the membrane 16 comprising the majority of the wall of section 6 due to impregnation with a polymer solution in which the plastic has accumulated on its fibers and constricted the gaps between them. The membrane 17 can be impregnated so strongly that the gaps between the fibers of the fabric are essentially sealed by the impregnating plastic. However, in one embodiment the membrane 17 enveloping the section 7 also exhibits a non-zero permeability, so that impact energy can be dissipated by forcing gas through the membrane 17 during the deceleration process.

The two membranes 16, 17 are here attached to each other by the seam 9 interrupted at the level of sectional plane III-III; overlapping portions of the membranes 16, 17 can also be flatly adhesively bonded or welded, e.g., on edge strips 18 of the membrane 17 that protrude over the seam 9. However, in the case shown on FIG. 3, where the edge strips 18 of the less permeable membrane 17 comprise part of the wall of the section 6, care must be taken that the membranes 16, 17 not overlap so much that the average permeability of section 6 becomes less than that of section 7.

The check valve 14 that joins the two sections 6, 7 is here designed as a lip valve. Two lips 19 of the valve 14 are here each formed by edge strips of the membrane 16, which instead of being joined together by the seam 9, protrude into the second central section 7. FIG. 3 shows the lip valve 14 in an open state, while gas streams over from the first central section 6 to the second central section 7. As soon as the gasbag 1 has completely inflated, and the flow through the valve 14 has subsided, the first central section 6 begins to lose pressure due to the relatively high permeability of its membrane 16.

The resultant excess pressure in the second central section 7 presses the lips 19 against each other, thereby closing the valve 14.

A passage with an inserted mesh 20 is visible in the membrane 12 on a bulkhead of the first central section 6. Situated opposite the mesh 20, on the side of the membrane 12 facing the end section 8, is a flexible, possibly also elastically extensible, impermeable membrane piece 21, which completely covers the passage provided with the mesh 20. The mesh 20 and membrane piece 21 together form the check valve 13.

FIG. 4 shows this check valve 13 and the end section 8 supplied with gas by way of the check valve 13 in a cross section along the IV-IV plane recorded on FIG. 3 and FIG. 2. An outer wall of the end section 8 is composed of an edge of the membrane 16 protruding over the membrane 12 and a membrane 22 whose permeability is less than that of the membrane 16, and which is joined with the membrane 16 by way of a stitched or welded seam 30.

In the configuration on FIG. 4, the membrane piece 21 is forced apart from the mesh 20 by gas flowing through the mesh 20. The membrane piece 21 is secured to the membrane 15 at two opposing edges of the mesh 20, here at the upper and lower edges. As the flow of gas through the valve 13 subsides, this ensures that the excess pressure that then arises in the end section 8 presses the membrane piece 21 against the mesh 20, thereby closing the valve 13. Because the mesh 20 supports the membrane piece 21 over its entire expansion, the membrane piece 21 is prevented from being pressed into the section 6 through the passage of the membrane 12 when excess pressure prevails in the section 8, which would cause the valve 13 to leak.

FIG. 5 shows a section along the IV-IV plane according to a second embodiment. As opposed to FIG. 4, where the membrane 16 of the section 6 transitions into the membrane enveloping the end section 8 as a single piece, the end section 8 is here bordered by a separate membrane 22, which contacts the membrane 16 of the first central section on its face 23 over a large surface. The membranes 16, 22 can be attached to each other by a seam 24 running all around the face 23, and a second seam envelops the opening of the valve 13, whose membrane piece 21 can here be a one-piece constituent of the membrane 22 of the end section 8.

FIG. 6 shows a third embodiment of the gasbag 1 in a top view analogous to FIG. 2. A first difference relative to the embodiment on FIG. 2 is that the gas generator 11 is here not hooked up directly to the inlet opening 10 of the first central section 6, but rather that the two instead have arranged between them a distributor 25 with branched, tubular lines 26, 27, one of which, 26, is connected in the first central section 6, and the other, 27, is connected to the end sections 8. Check valves 13 that prevent gas from flowing back from the relatively sparingly permeable end sections 8 to the more permeable first, central section 6 are situated in the lines 27 or on the lines 27 with the ports joining the end sections 8.

As in the first embodiment, the second central section 7 is joined indirectly with the gas generator 11 by way of a valve 14 inserted in the seam 9 between the sections 6, 7.

A second difference independent of the presence or absence of the distributor 25 has to do with the fact that, as evident in particular in the cross section on FIG. 7, a seam 28 is provided between the sections 6, 8 instead of the large-surface membrane 12.

A third difference lies in the fact that, as opposed to the seam 9 in the cross section on FIG. 3, the membranes of different sections are not connected with each other along the seam 28; instead, the membrane 16 of the first, central section 6 and a membrane 29 of the end section 8 are here joined as a single piece over the seam 28. A varying permeability is here achieved for the first central section 6 and end section 8 by locally impregnating a backing fabric comprising both membranes 16, 29 before generating the seam 28, e.g., via silk-screen printing, whereupon a region of the backing fabric that was slightly impregnated or not at all becomes the membrane 16, while an impregnated or strongly impregnated region becomes the membrane 29.

In the embodiment on FIG. 7, the check valve 14 is designed as a flap valve at the point where the line 27 is connected to the end section 8.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A gasbag for a pedestrian protection system in a motor vehicle, comprising:
   a first central section that, when inflated, is oblong and substantially extends a width of the motor vehicle;
   a second central section that, when inflated, substantially extends the width of the motor vehicle;
   end sections which, when inflated, angle away from ends of the second central section, wherein the first central section is more strongly cushioned than the second central section and the end sections
   a plurality of check valves, each of the plurality of check valves being arranged between the first central section and one of the end sections, each of the plurality of check valves comprising:
      a mesh sheet arranged between the first central section and each of the end sections, and
      an impermeable membrane secured at two opposing ends of each of the mesh sheets.

2. The gasbag according to claim 1, wherein the gasbag exhibits at least one first and one second membrane with differing permeability values, and that different cushioning levels for the first central section and the end sections are realized by distributing the at least one first and one second membranes over the end sections in such a way that an average permeability of the end sections is lower than an average permeability of the first central section.

3. The gasbag according to claim 1, wherein the second central section extends next to the first central section between the end sections.

4. The gasbag according to claim 1, wherein a supply port for a gas generator is provided on the first central section, and at least one of the end sections and the second central section of the gasbag can be supplied with gas via the first central section.

5. The gasbag according to claim 1, further comprising:
   a gas generator; and
   a distributor configured to supply a port for the gas generator, and ports connected with the first central section and the end sections.

6. The gasbag according to claim 1, wherein each of the plurality of check valves only allows gas to flow from an upstream to a downstream location.

7. The gasbag according to claim 6, wherein the downstream location exhibits a lower average permeability than the upstream section.

8. The gasbag according to claim 6, wherein the first central section and each of the end sections extend on different sides of at least one partitioning membrane that partitions the gasbag.

9. The gasbag according to claim 8, wherein each of the plurality of check valves is situated at a passageway of one of the at least one partitioning membrane.

10. The gasbag according to claim 6, wherein each of the plurality of check valves is a flap valve.

11. The gasbag according to claim 6, wherein the first central section and each of the end sections border each other along a seam.

12. The gasbag according to claim 11, wherein each of the plurality of check valves is situated in a gap in the seam.

13. The gasbag according to claim 6, further comprising a lip valve situated between the first central section and the second central section.

14. The gasbag according to claim 2, wherein the first and the second membrane exhibit an identical backing fabric and differing impregnations.

15. A motor vehicle, comprising:
a gasbag, comprising:
- a first central section that, when inflated is oblong and substantially extends a width of the motor vehicle;
- a second central section that, when inflated, substantially extends the width of the motor vehicle;
- end sections which, when inflated, angle away from ends of the second central section; and
- a plurality of check valves, each of the plurality of check valves being arranged between the first central section and one of the end sections, the check valve comprising:
  - a mesh sheet arranged between the first central section and each of the end sections, and
  - an impermeable membrane secured at two opposing ends of each of the mesh sheets,
- wherein the first central section is more strongly cushioned than the second central section and the end sections.

16. A motor vehicle according to claim 15, wherein when the gasbag is in an inflated state, the first central section of the gasbag supports a front opening hood of the motor vehicle, and the end sections cover A-columns of the motor vehicle.

17. The gasbag according to claim 1, wherein the first central section is configured to lift a hood of the motor vehicle.

* * * * *